(12) United States Patent
Ellis, II

(10) Patent No.: US 12,032,700 B2
(45) Date of Patent: Jul. 9, 2024

(54) EMBEDDED REMOVABLE BOOT DRIVE

(71) Applicant: CRU Data Security Group, LLC, Vancouver, WA (US)

(72) Inventor: Murray John Ellis, II, San Jose, CA (US)

(73) Assignee: CRU Data Security Group, LLC, Vancouver, WA (US)

( * ) Notice: Subject to any disclaimer, the term of this patent is extended or adjusted under 35 U.S.C. 154(b) by 656 days.

(21) Appl. No.: 17/052,796

(22) PCT Filed: May 3, 2019

(86) PCT No.: PCT/US2019/030751
§ 371 (c)(1),
(2) Date: Nov. 3, 2020

(87) PCT Pub. No.: WO2019/213628
PCT Pub. Date: Nov. 7, 2019

(65) Prior Publication Data
US 2021/0365562 A1    Nov. 25, 2021

Related U.S. Application Data

(60) Provisional application No. 62/666,635, filed on May 3, 2018.

(51) Int. Cl.
| | | |
|---|---|---|
| G06F 9/00 | (2006.01) | |
| G06F 1/16 | (2006.01) | |
| G06F 1/18 | (2006.01) | |
| G06F 15/177 | (2006.01) | |
| G06F 21/32 | (2013.01) | |
| G06F 21/57 | (2013.01) | |

(Continued)

(52) U.S. Cl.
CPC ............ *G06F 21/575* (2013.01); *G06F 1/163* (2013.01); *G06F 1/1656* (2013.01); *G06F 1/187* (2013.01); *G06F 21/32* (2013.01); *G06F 21/602* (2013.01); *G06F 21/6218* (2013.01)

(58) Field of Classification Search
CPC ........ G06F 21/575; G06F 21/32; G06F 1/163; G06F 1/1656; G06F 1/187
See application file for complete search history.

(56) References Cited

U.S. PATENT DOCUMENTS

| | | | | |
|---|---|---|---|---|
| 6,035,395 A * | 3/2000 | Saito | .................... | G06F 9/4406 |
| | | | | 713/1 |
| 6,088,794 A * | 7/2000 | Yoon | .................... | G06F 3/0625 |
| | | | | 713/2 |

(Continued)

FOREIGN PATENT DOCUMENTS

| | | | | |
|---|---|---|---|---|
| WO | 2015124798 | | 8/2015 | |
| WO | WO-2015124798 A2 * | | 8/2015 | ............ G06F 21/35 |

OTHER PUBLICATIONS

International Application No. PCT/US2019/030751 International Search Report and Written Opinion mailed Jul. 17, 2019.

*Primary Examiner* — Mohammed H Rehman
(74) *Attorney, Agent, or Firm* — Ahmann Kloke LLP

(57) ABSTRACT

A system including an embedded removable-boot-drive plug-in device and an embedded removable-boot-drive host device is disclosed. Additionally, a method of using the embedded-removable-boot-drive system is disclosed. The system and method provide security to, and accessibility of, stored data and/or boot-drive devices.

9 Claims, 10 Drawing Sheets

(51) Int. Cl.
*G06F 21/60* (2013.01)
*G06F 21/62* (2013.01)

(56) References Cited

U.S. PATENT DOCUMENTS

| | | | |
|---|---|---|---|
| 9,251,047 B1* | 2/2016 | McKelvie | G06F 21/85 |
| 2005/0033564 A1* | 2/2005 | Kortum | G06F 11/3688 |
| | | | 703/22 |
| 2005/0144464 A1 | 6/2005 | Chiu | |
| 2006/0085631 A1 | 4/2006 | Young | |
| 2007/0094489 A1 | 4/2007 | Ota | |
| 2007/0214369 A1 | 9/2007 | Roberts | |
| 2008/0104386 A1 | 5/2008 | Van Rooyen | |
| 2008/0294835 A1 | 11/2008 | Merry, Jr. | |
| 2009/0254898 A1* | 10/2009 | Sareen | G06F 11/1433 |
| | | | 713/1 |
| 2011/0225411 A1* | 9/2011 | Hara | H04L 67/1097 |
| | | | 713/2 |
| 2012/0043325 A1* | 2/2012 | Williams | B65D 79/008 |
| | | | 220/270 |
| 2014/0256419 A1* | 9/2014 | Laputz | G07F 17/3241 |
| | | | 463/29 |
| 2015/0261544 A1 | 9/2015 | Manlapat | |
| 2017/0300340 A1* | 10/2017 | Ellis, II | G06F 13/4282 |

* cited by examiner

EMBEDDED REMOVABLE BOOT DRIVE

CROSS-REFERENCE TO RELATED APPLICATIONS

This application is a national phase application pursuant to 35 U.S.C. § 371 of International Application No. PCT/US2019/030751 filed May 3, 2019, which claims priority to U.S. Provisional Patent Application Ser. No. 62/666,635 filed May 3, 2018, the disclosures of which are incorporated by reference herein.

DETAILED DESCRIPTION

Figure 1:
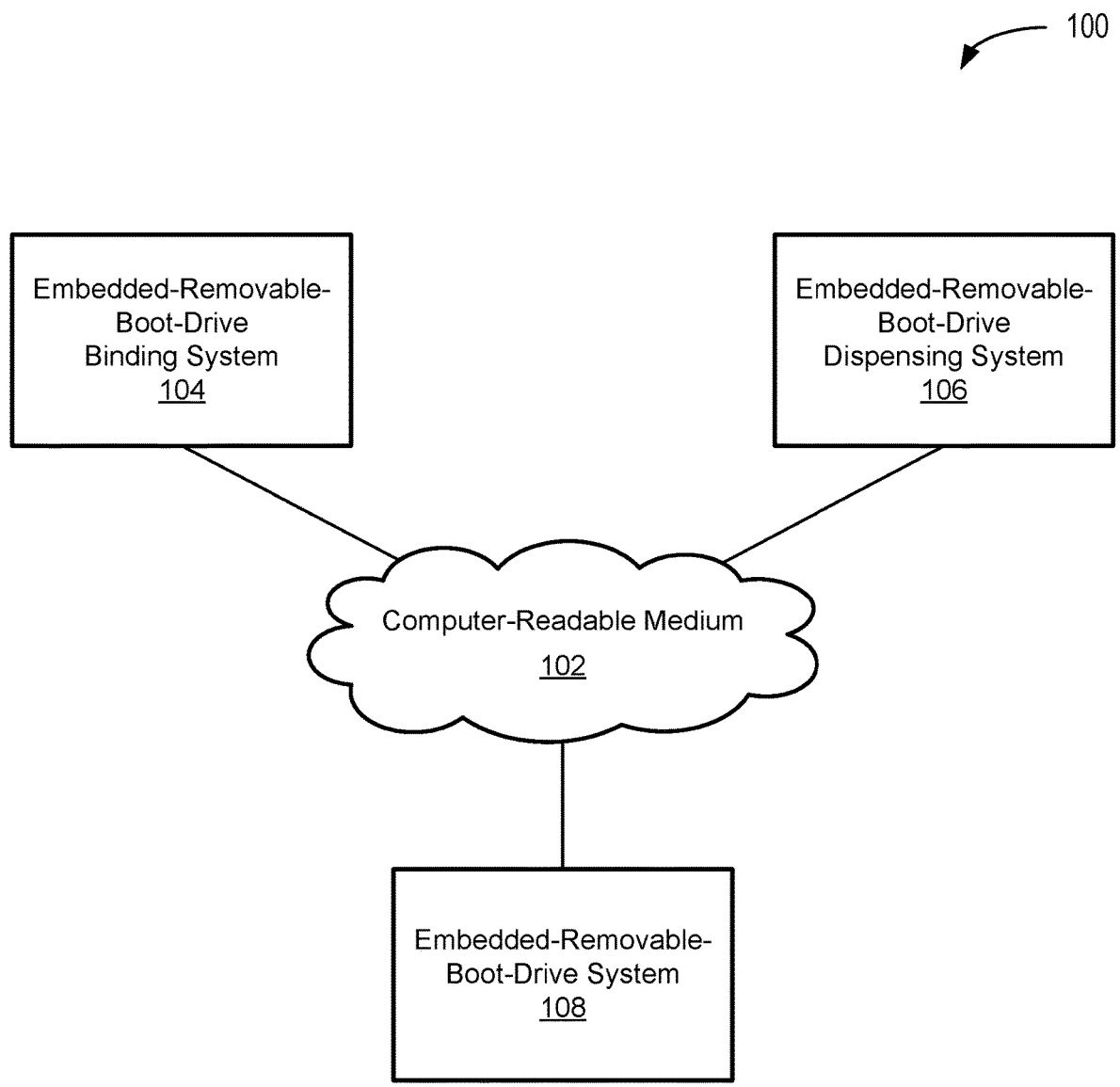
FIG. 1 is a block diagram of an example of a system for providing access to an embedded-removable-boot-drive system.

FIG. 1 is a block diagram 100 of an example of a system for providing access to an embedded-removable-boot-drive system (embedded-RBD system). The diagram 100 includes a computer-readable medium (CRM) 102, an embedded-removable-boot-drive binding system (embedded-RBD binding system) 104 coupled to the CRM 102, an embedded-removable-boot-drive dispensing system (embedded-RBD dispensing system) 106 coupled to the CRM 102, and an embedded-removable-boot-drive system (embedded-RBD system) 108 coupled to the CRM 102.

The CRM 102 is intended to represent a variety of potentially applicable technologies. For example, the CRM 102 can be used to form a network or part of a network. Where two components are co-located on a device, the CRM 102 can include a bus or other data conduit or plane. Where a first component is co-located on one device and a second component is located on a different device, the CRM 102 can include a wireless or wired back-end network or LAN. The CRM 102 can also encompass a relevant portion of a WAN or other network, if applicable.

As used in this paper, a "computer-readable medium" is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

Applicable systems or devices described in this paper can be implemented as a computer system, a plurality of computer systems, or parts of a computer system or a plurality of computer systems. In general, a computer system will include a processor, memory, non-volatile storage, and an interface and the examples described in this paper assume a stored program architecture, though that is not an explicit requirement of the machine. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller. A typical CPU includes a control unit, arithmetic logic unit (ALU), and memory (generally including a special group of memory cells called registers).

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

In stored program architectures, software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the FIGS. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

The embedded-RBD binding system 104 is intended to represent hardware configured to associate at least one embedded removable-boot-drive plug-in device (embedded-RBD plug-in device) with at least one operator. In a specific implementation, when identification information is provided to the embedded-RBD binding system 104, the embedded-RBD binding system 104 provides a recording of the association between a particular embedded-RBD plug-in device and a particular person. In a specific implementation, when identification information is provided to the embedded-RBD binding system 104, the embedded-RBD binding system 104 provides a recording of the association between a particular embedded-RBD plug-in device and more than one person. In a specific implementation, when identification information is provided to the embedded-RBD binding system 104, the embedded-RBD binding system 104 provides a recording of the association between more than one embedded-RBD plug-in device and a particular person. In a specific implementation, when identification information is provided to the embedded-RBD binding system 104, the embedded-RBD binding system 104 provides a recording of the association between more than one embedded-RBD plug-in device and more than one person. In a specific implementation, particular embedded-RBD plug-in devices are given particular identification numbers. In a specific implementation, identification information includes, directly or indirectly, a person's name, assignment number, employment position, or employment department.

In a specific implementation, identification information is obtained from a source that can distinguish a particular person from a group of people based on that person's: personal information, knowledge, or possessions. In a specific implementation, personal information includes an issued certificate such as a driver's license, a passport, an employment-ID badge. In a specific implementation, personal information includes biometric data such as a person's finger print or voice, or a person's facial, iris, or vein characteristics. In a specific implementation, knowledge includes passwords, user names, and PINs. In a specific implementation, possessions includes tokens, keys, QR codes, barcodes, and two-factor authentication devices.

The embedded-RBD dispensing system 106 is intended to represent hardware configured to process an embedded-RBD plug-in device and to provide the processed embedded-RBD plug-in device to a designated operator. In a specific implementation, the embedded-RBD dispensing system 106 includes a secure physical embedded-RBD plug-in device vault that releases an embedded-RBD plug-in device from the vault upon particular instruction. In a specific implementation, the embedded-RBD dispensing system 106 is used in a secured facility, includes storage for more than one embedded-RBD plug-in device, and allows a user to access the embedded-RBD plug-in device to which the embedded-RBD binding system 104 has associated with that operator. In a specific implementation, the embedded-RBD dispensing system 104 is located at a sequestered facility managed by a governmental entity.

In a specific implementation, the embedded-RBD dispensing system determines whether the user has appropriate rights to access an embedded-RBD plug-in device. In a specific implementation, a user, upon providing identification information, is associated with an embedded-RBD plug-in device through the embedded-RBD binding system 104, and then the user is provided the embedded-RBD plug-in device through the embedded-RBD dispensing system 106 without any further requirements of the user. In a specific implementation, the embedded-RBD dispensing system 106 provides instructions in response to verifying identification information of a user. In a specific implementation, the embedded-RBD dispensing system 106 provides instructions to track the embedded-RBD plug-in device after release of the embedded-RBD plug-in device from a secure physical vault. In a specific implementation, data stored on an embedded-RBD plug-in device is subject to protection in addition to or in lieu of the protection provided by the embedded-RBD dispensing system, such as a combination of encryption and passwords.

The embedded-RBD system 108 is intended to represent a secure system for a user to access and/or store data. In a specific implementation, the embedded-RBD system 108 includes an embedded-RBD host device and an embedded-RBD plug-in device. In a specific implementation, the embedded-RBD system 108 includes an embedded-RBD host device, an embedded-RBD plug-in device, and a two-factor authentication device.

Figure 2:
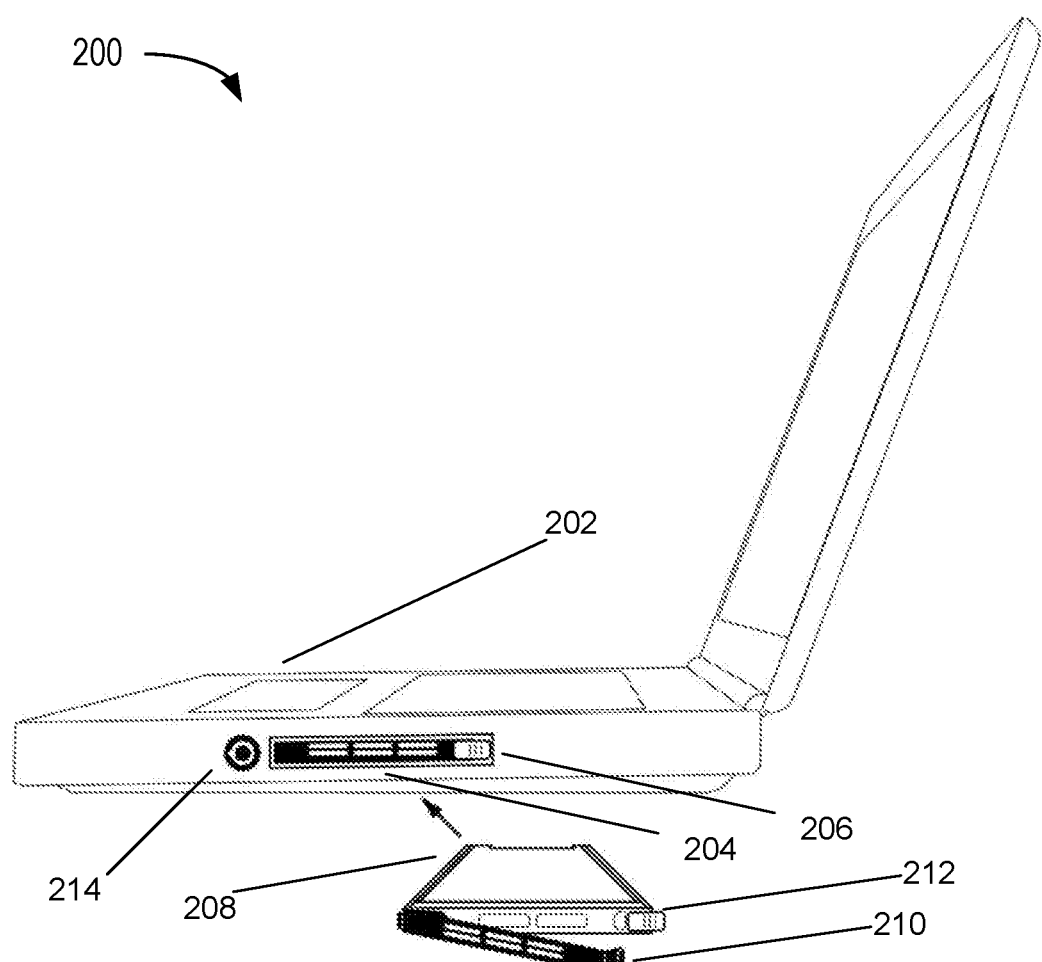
FIG. 2 is a conceptual diagram of an example of an embedded-removable-boot-drive system.

FIG. 2 is a conceptual diagram 200 of an example of an embedded-RBD system. The diagram 200 includes an embedded-RBD host device 202, an embedded-RBD mount opening (mount opening) 204 located on a side of the embedded-RBD host device 202, an embedded-RBD mount clip (mount clip) 206 attached to the mount opening 204, an embedded-RBD plug-in device 208 than can be aligned with the mount opening 204, an embedded-RBD handle (handle) 210 that is positioned alongside the embedded-RBD plug-in device 208, an embedded-RBD plug-in clip (plug-in clip) 212 attached to the embedded-RBD plug-in device 208, and an embedded-RBD lock (lock) 214 positioned along the side of the embedded-RBD host device 202.

The embedded-RBD host device 202 is intended to represent hardware capable of—when coupled with the embedded-RBD plug-in device 208—allowing a user to securely access and/or store data. In the conceptual diagram 200, the embedded-RBD host device 202 resembles a standard laptop computer. The embedded-RBD host device 202 has a right side, a left side, a front side, a back side, a top side, and a bottom side. In a specific implementation, the embedded-RBD host device 202 includes a display screen, a keyboard, and a mousepad on the top side of the embedded-RBD host device 202. In a specific implementation, the embedded-RBD host device 202 includes a CD or DVD drive. In a specific implementation, the embedded-RBD host device 202 includes a battery and at least one processor. In a specific implementation, the embedded-RBD host device 202 includes internal memory, or a memory port that is separate from the mount opening 204.

The mount opening 204 is intended to represent hardware configured to couple the embedded-RBD plug-in device 208 to the embedded-RBD host device 202. In conceptual diagram 200, the mount opening 204 is located on the right side of the embedded-RBD host device 202. It should be noted that, depending on implementation-specific or other considerations, the mount opening could alternatively be located on the left side, the front side, the back side, the bottom side, or the top side of the embedded-RBD host device 202. In a specific implementation, the mount opening 204 includes electrical contacts or connectors that can couple the battery and/or processors of the embedded-RBD host device 202 to the embedded-RBD plug-in device 208. In a specific implementation, the mount opening 204 includes a door or lid that closes when the embedded-RBD plug-in device 208 is not inserted into the mount opening 204. In a specific implementation, the mount opening 204 includes a door or lid that closes when the embedded-RBD plug-in device 208 is fully inserted into the mount opening 204. In a specific implementation, a door or lid can clip into place through the use of a spring and latch. In a specific implementation, the mount opening 204 receives the embedded-RBD plug-in device 208 and causes pre-boot firmware to be loaded onto the embedded-RBD host device 202. In a specific implementation, the mount opening 204 includes an opening having dimensions substantially similar to the dimensions of the embedded-RBD plug-in device 208. In a specific implementation, the mount opening 204 includes an opening that is substantially rectangular.

In a specific implementation, the mount opening 204 is large enough to encompass the entire embedded-RBD plug-in device 208. In a specific implementation, the mount opening 204 is large enough to encompass only part of the embedded-RBD plug-in device 208, leaving at least part of the embedded-RBD plug-in device 208 external to both the mount opening 204 and the embedded-RBD host device 202, when the embedded-RBD plug-in device 208 is coupled to the embedded-RBD host device 202.

In a specific implementation, the mount opening 204 allows the embedded-RBD plug-in device 208 to be easily connected and disconnected from the embedded-RBD host device 202, and does not require the burdensome removal of screws, rivets, or solder for that removal. In a specific implementation, the mount opening 204 allows the embedded-RBD plug-in device 208 to be connected and disconnected from the embedded-RBD host device 202 without requiring a user to attach electrical connectors and secure the embedded-RBD plug-in device 208 to the embedded-RBD host device 202 in two separate steps or motions. In a specific implementation, the mount opening 204 allows the embedded-RBD plug-in device 208 to be connected and disconnected from the embedded-RBD host device 202 without also removing a battery panel, a bottom cover, or a battery. In a specific implementation, when connecting the embedded-RBD plug-in device 208 to the embedded-RBD host device 202 for the first time, computer applications and/or programs do not need to be installed onto the embedded-RBD host device 202 to access data on the embedded-RBD plug-in device 208. In a specific implementation, attaching the embedded-RBD plug-in device 208 to the mount opening 204 includes aligning, connecting, coupling, or putting the two devices into contact with each other.

The mount clip 206 is intended to represent hardware configured to physically secure the embedded-RBD plug-in device 208 to the mount opening 204. In a specific implementation, the mount clip 206 includes a lever and a spring, and the spring can force the lever into a position behind the embedded-RBD plug-in device 208—or part of the embedded-RBD plug-in device 208—when the embedded-RBD plug-in device 208 is coupled to the embedded-RBD host device 202 at the mount opening 204. In a specific implementation, the mount clip 206 includes a switch that can slide back-and-forth across a portion of the mount opening 204 so that part of the switch can be positioned behind the embedded-RBD plug-in device 208—or part of the embedded-RBD plug-in device 208—when the embedded-RBD plug-in device 208 is coupled to the embedded-RBD host device 202 at the mount opening 204. In a specific implementation, the mount clip 206 is mechanically coupled to an internal lever that presses against both the embedded-RBD host device 202 and the embedded-RBD plug-in device 208, either maintaining a physical relationship between the two through pressure alone, or maintaining the physical relationship through the internal lever's position within a groove on the embedded-RBD plug-in device 208. In a specific implementation, a force can be applied to the mount clip 206—or to a button associated with the mount clip 206—to allow the embedded-RBD plug-in device 208 to be extracted from the mount opening 204 and the embedded-RBD host device 202. In a specific implementation, the mount clip 206 is substituted with a door or lid on the mount opening 204 that closes behind the embedded-RBD plug-in device 208.

The embedded-RBD plug-in device 208 is intended to represent hardware configured to store data and be attached to, and removed from, the embedded-RBD host device 202. In a specific implementation, the embedded-RBD plug-in device 208 includes a standard memory device. In a specific implementation, the embedded-RBD plug-in device 208 includes a boot drive. A boot drive includes hardware that can read files required for a computer to start, or that contains files required for a computer to start. In a specific implementation, the embedded-RBD plug-in device 208 includes a standard SSD. In a specific implementation, the embedded-RBD plug-in device 208 is a modified, stand-alone memory-storage device. In a specific implementation, the embedded-RBD plug-in device 208 includes an SSD and a caddy. In a specific implementation, a caddy includes a small storage container or attachment in which a memory device can be positioned, and includes electrical contacts or connectors. In a specific implementation, an embedded-RBD plug-in device 208 includes a caddy that houses an SSD, and wires within the caddy that couple the electrical contacts or connectors of the SSD to electrical contacts or connectors within the mount opening 204. In a specific implementation, an embedded-RBD plug-in device 208 includes an SSD that has contacts or connectors that couple the electrical contacts or connectors within the mount opening 204, without the use of a caddy.

In a specific implementation, the embedded-RBD plug-in device 208 includes both a boot drive and memory storage. In a specific implementation, the embedded-RBD plug-in device 208 is inserted into the mount opening 204 similar to how a standard floppy disk is inserted into a floppy drive. In a specific implementation, the embedded-RBD plug-in device 208 can encrypt and decrypt data stored within the embedded-RBD plug-in device 208. In a specific implementation, the embedded-RBD plug-in device 208 is formed of a sturdy material, capable of withstanding daily, or even more frequent, insertions.

The handle 210 is intended to represent an extension to the embedded-RBD plug-in device 208 that can be used to assist in extracting and/or holding the embedded-RBD plug-in device 208. In a specific implementation, the handle 210 can rotate about a hinge to transition from being positioned alongside the embedded-RBD plug-in device 208 to being fully extended from the embedded-RBD plug-in device 208. In a specific implementation, the handle 210 can clip onto the embedded-RBD plug-in device 208 for temporary positioning alongside the embedded-RBD plug-in device 208. In a specific implementation, the handle 210 can assist a user tin carrying the embedded-RBD plug-in device 208 separately from the embedded-RBD host device 202. In a specific implementation, the handle 210 can be pulled by a user to extract the embedded-RBD plug-in device 208 from the mount opening 204, thereby separating the embedded-RBD plug-in device 208 and the embedded-RBD host device 202.

In a specific implementation, extracting the embedded-RBD plug-in device 208 from the mount opening 204 is aided through the use of a spring, with or without the use of a handle 210. In a specific implementation, extracting the embedded-RBD plug-in device 208 from the mount opening 204 is initiated by clicking a button that releases a lever and allows a spring to force the embedded-RBD plug-in device 208 away from the back of the mount opening 204. In a specific implementation, the handle 210 is a fixed aperture attached to the embedded-RBD plug-in device 208, which cannot rotate about a hinge.

The plug-in clip 212 is intended to represent hardware configured to physically secure the embedded-RBD plug-in device 208 to the mount opening 204. In the conceptual diagram 200, the plug-in clip 212 is used in combination with the mount clip 206, but it should be noted that, in a specific implementation, only one of the plug-in clip 212 and the mount clip 206 is used. In a specific implementation, the plug-in clip 212 includes a lever and a spring, and the spring can force the lever into a position behind a portion of the mount opening 204 when the embedded-RBD plug-in device 208 is coupled to the embedded-RBD host device 202 at the mount opening 204. In a specific implementation, the plug-in clip 212 includes a switch that can slide back-and-forth across a portion of the embedded-RBD plug-in device 208 so that part of the switch is positioned within a groove in the mount opening 204 when the embedded-RBD plug-in device 208 is coupled to the embedded-RBD host device 202.

In a specific implementation, the plug-in clip 212 is mechanically coupled to a lever that is located in a separate place on the embedded-RBD plug-in device 208, pressing against both the embedded-RBD host device 202 and the embedded-RBD plug-in device 208, either maintaining a physical relationship between the two through pressure alone, or maintaining the physical relationship through the lever's position within a groove in the mount opening 204. In a specific implementation, a force can be applied to the plug-in clip 212 to allow the embedded-RBD plug-in device 208 to be extracted from the mount opening 204, and to thereby be extracted from the embedded-RBD host device 202.

The lock 214 is intended to represent hardware configured to physically secure the embedded-RBD plug-in device 208 to the mount opening 204, including the use of a key. In a specific implementation, when a user inserts a key (not shown) into the lock 214, a lever in the mount opening 204 rotates into place within a groove on the embedded-RBD plug-in device 208. In a specific implementation, the lock 214 can be user in lieu of the mount clip 206. In a specific implementation, the lock 214 can function as a mount clip 206 when a key is not used.

Figure 3:
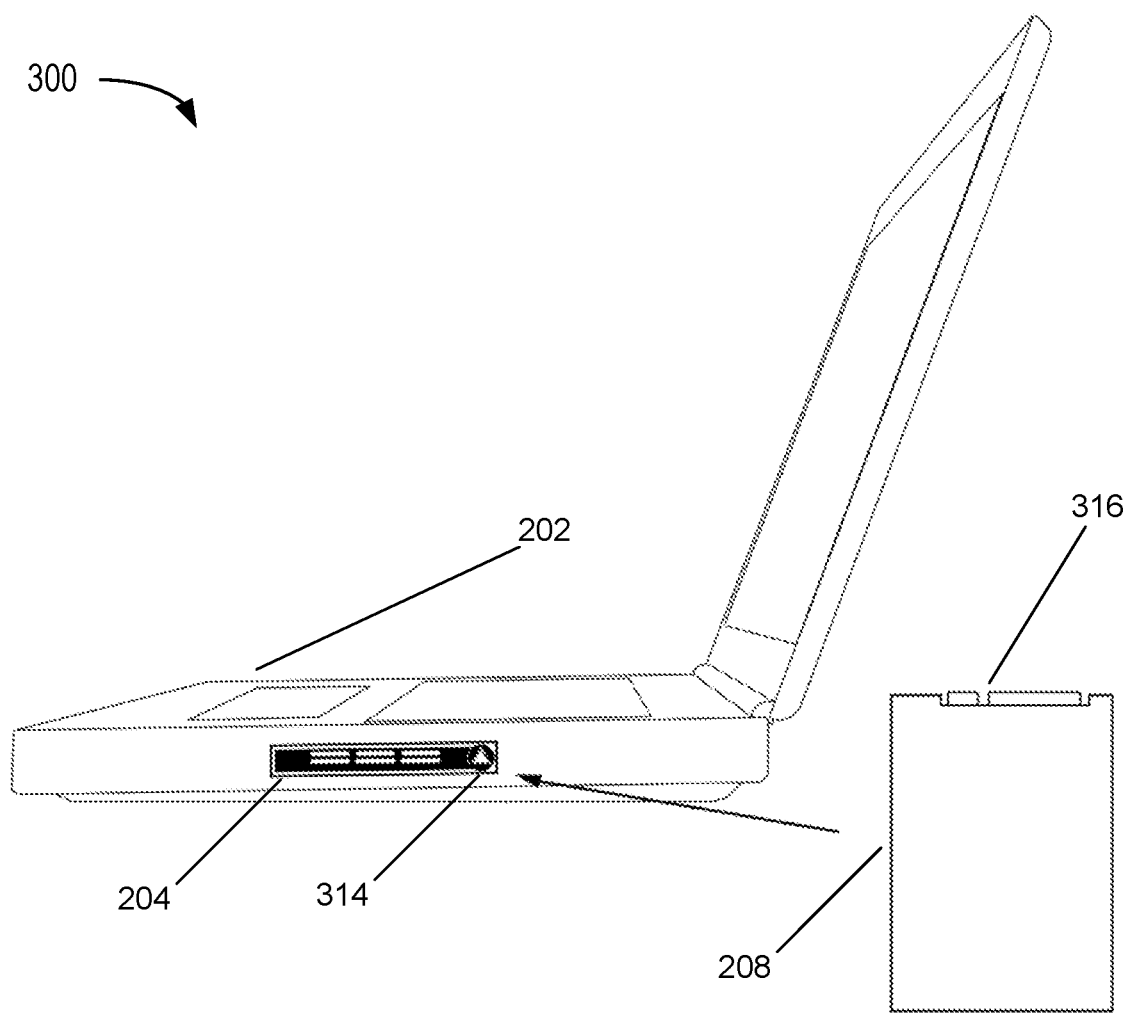
FIG. 3 is a conceptual diagram of an example of an embedded-removable-boot-drive system.

FIG. 3 is a conceptual diagram 300 of an example of an embedded-RBD system. The diagram 300 includes an embedded-RBD host device 202, an embedded-RBD mount opening (mount opening) 204 positioned along a side of the embedded-RBD host device 202, an embedded-RBD plug-in device 208 than can be attached to the mount opening 204, an embedded-RBD lock (lock) 314 positioned on the mount opening 204, and a caddy connector 316 positioned on the embedded-RBD plug-in device 208.

As illustrated in diagram 300, the mount clip 206, handle 210, and plug-in clip 212 of diagram 200 are optional components of the embedded-RBD system. The lock 314 of diagram 300 is intended to illustrate that a locking mechanism, which is used to secure the embedded-RBD plug-in device 208 against undesired removal, can be located on the mount opening 204 in lieu of the mount clip 206 of diagram 200; and that the lock 314 of diagram 300 can be used with triangle-shaped keys, as well as other styles of keys.

The caddy connector 316 is intended to represent hardware for data and power associated with the embedded-RBD plug-in device 208. In a specific implementation, the caddy connector 316 is associated with data and power used for SSD storage. In various implementations, the caddy connector 316 may change depending on drive type, size, etc., but, in some specific implementations, will be in the SATA, PCIe, NVMe, or similar realms. It should be noted there may be future data connection types that would also be applicable. In alternative implementations, the caddy connector 316 includes eSATA, USB, or similar technologies for data and/or power connectors. In a specific implementation, the caddy connector 316 includes an adaptor to convert the type of connectors of a boot drive to another connector or port-type. In a specific implementation, the mount opening 204 includes a port that connects to the port of the caddy connector 316 as a result of the embedded-RBD plug-in device 208 being inserted into the mount opening 204.

Figure 4:
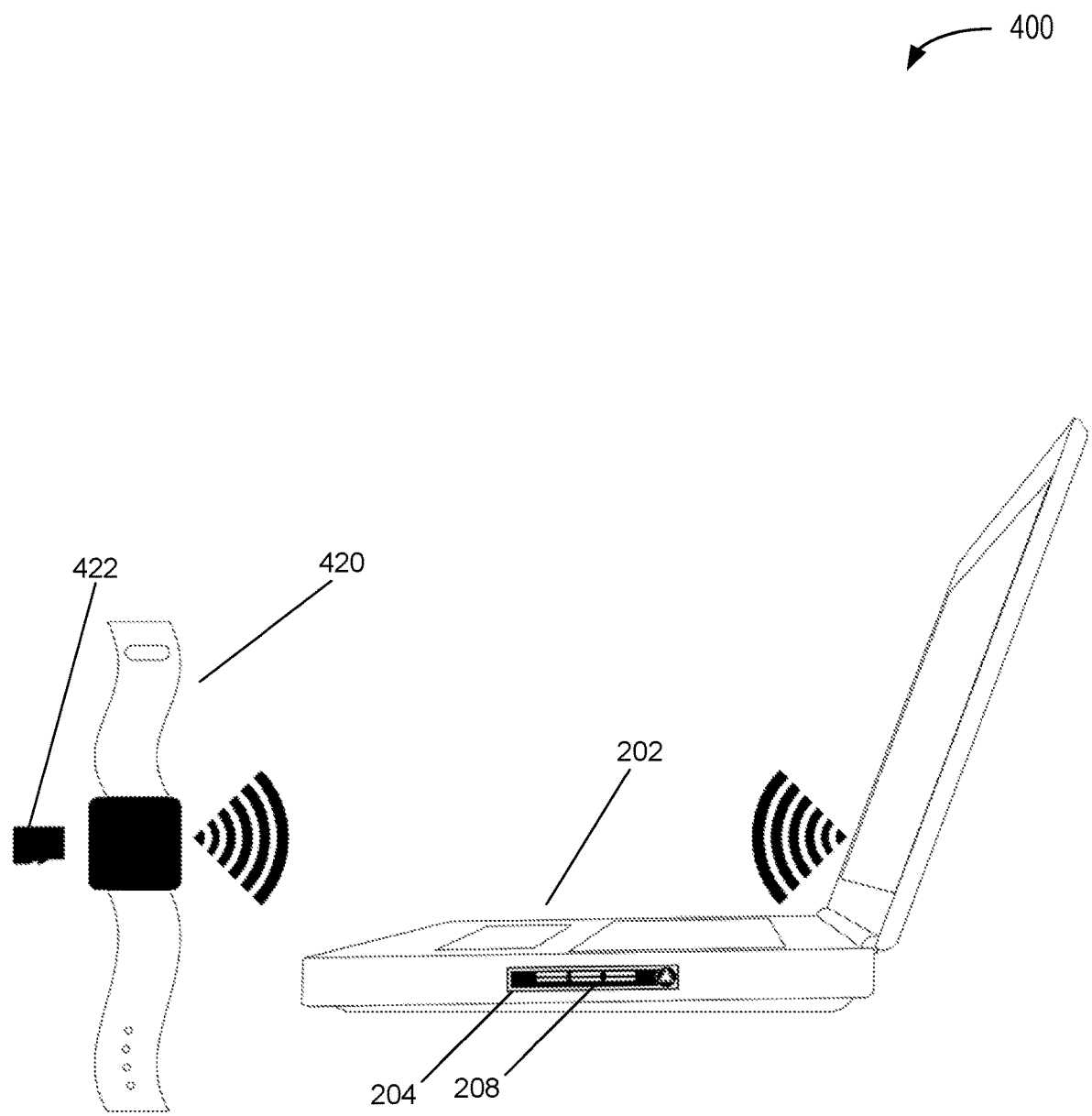
FIG. 4 is a conceptual diagram of an example of an embedded-removable-boot-drive system including two-factor authentication.

FIG. 4 is a conceptual diagram 400 of an example of an embedded-RBD system including two-factor authentication. Two-factor authentication is an extra layer of security that requires more than one source of identification information. Often times, a memory or boot-drive of a computing system does not contain a maximum number of attempts in order to try to guess a password to attain access to the stored data and operate the device, which allows for brute-force attacks by a hacker. However, two-factor authentication has the potential of preventing any attempts to guess a password without having simultaneous possession of a particular additional device. The diagram 400 shows an example of a two-factor authentication system that includes a requirement that a user have possession-based authorization and knowledge-based authorization. The diagram 400 includes an embedded-RBD host device 202, a mount opening 204 located on the right side of the embedded-RBD host device 202, an embedded-RBD plug-in device 208 positioned within the mount opening 204, a two-factor authentication device (2FA device) 420, and a memory card 422 that can be positioned within the 2FA device 420.

The 2FA device 420 is intended to represent hardware configured to provide security information. In the diagram 400, the 2FA device 420 is a smart-watch, though the 2FA device can also be a different smart device, such as smart-glasses, a smart-band (bracelet), smart ID-tags, a cell phone, or a tablet. In a specific implementation, the 2FA device 420 has built-in bluetooth or wifi compatibilities, as well as a built-in battery. In a specific implementation, the 2FA device 420 includes hardware that can be physically connected to the embedded-RBD host device 202 or the embedded-RBD plug-in device 208.

In a specific implementation, the 2FA device 420 receives an alert when the embedded-RBD plug-in device 208 is connected to the embedded-RBD host device 202 and boot-up is attempted. In a specific implementation, the 2FA device 420 receives an alert when the embedded-RBD plug-in device 208 is inserted into the mount opening 204, and electrically coupled to the embedded-RBD host device 202. In a specific implementation, an alert can include a notification, an option to accept or not accept particular operations, or a security code. In a specific implementation, an alert is sent to the 2FA device 420 from one of the embedded-RBD host device 202 and the embedded-RBD plug-in device 208.

In a specific implementation, the 2FA device 420 is within a distance of the embedded-RBD host device 202 that is suitable for bluetooth communications between the two devices. In a specific implementation, the 2FA device 420 is not within a distance of the embedded-RBD host device 202 that is suitable for bluetooth communications between the two devices, but communication otherwise takes place between the two devices through the internet, providing a user with an ability to permit access to the data on the embedded-RBD plug-in device 208 through the embedded-RBD host device 202. In a specific implementation, the data on the embedded-RBD plug-in device 208 cannot be accessed through the embedded-RBD host device 202 if the 2FA device 420 is not within reaching distance of the embedded-RBD host device 202 by the attempted user.

In a specific implementation, when a security code from the 2FA device 420 is provided to the embedded-RBD plug-in device 208, and the embedded-RBD plug-in device 208 is attached to the mount opening 204, a user can access the data on the embedded-RBD plug-in device 208. In a specific implementation, when the 2FA device 420 becomes disconnected from the embedded-RBD plug-in device 208, access to the data on the embedded-RBD plug-in device 208 through the embedded-RBD host device 202 will be discontinued.

The memory card 422 is intended to represent hardware configured to store security information associated with accessing data on the embedded-RBD plug-in device 208. In a specific implementation, the memory card 422 can be configured to be associated with a particular embedded-RBD plug-in device 208. In a specific implementation, the memory card 422 is removable from the 2FA device 420. In a specific implementation, the memory card 422 is not removable from the 2FA device 420. In a specific implementation, the memory card 422 can be inserted in the embedded-RBD plug-in device 208 or the embedded-RBD host device 202. In a specific implementation, the memory card 422 has security-level approval that the data on the embedded-RBD plug-in device 208 cannot be decrypted without. In a specific implementation, the memory card 422 is a MicroSD card. In a specific implementation, authentication cannot even be attempted without possession of the memory card 422 or the 2FA device 420.

Figure 5:
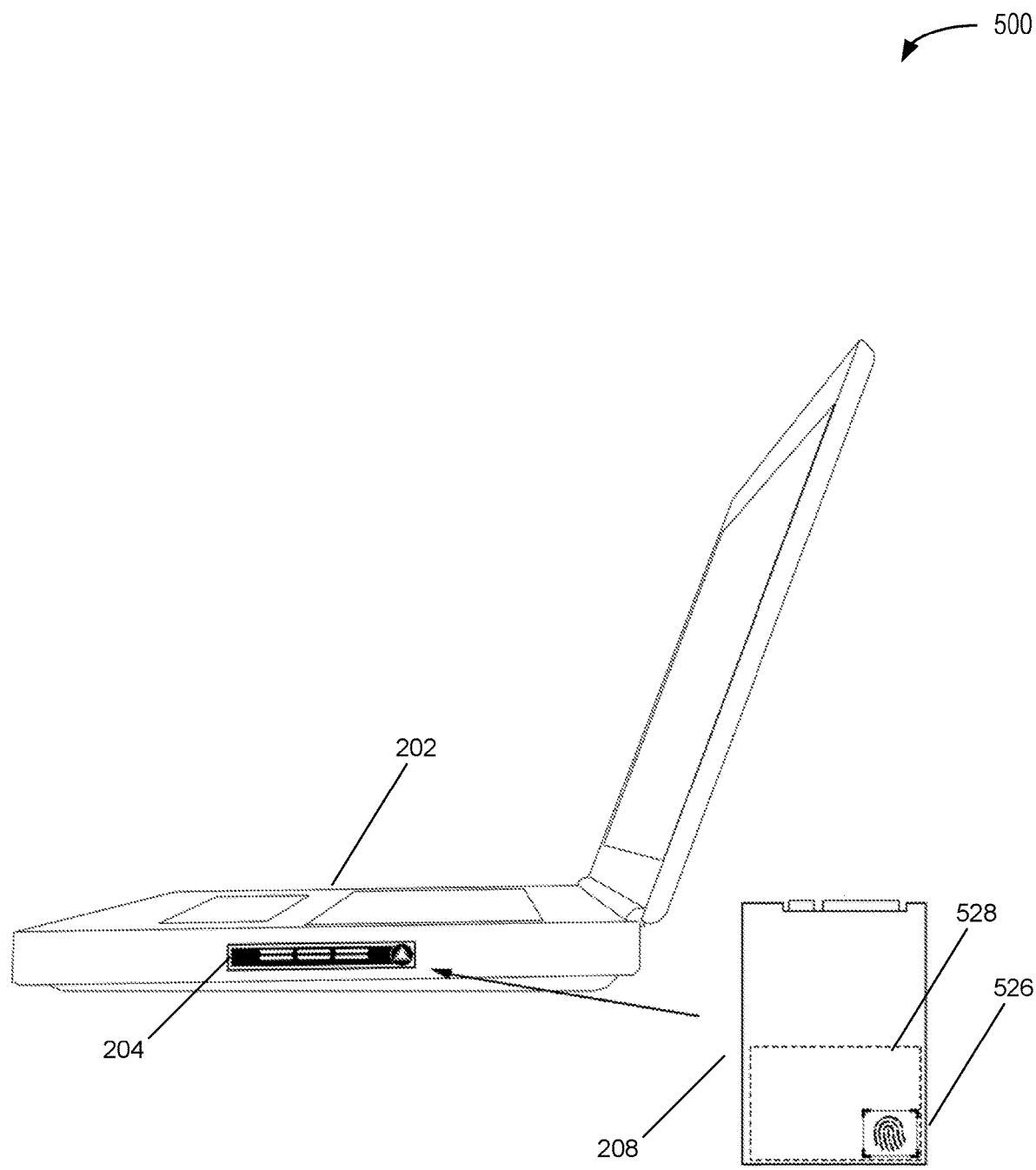
FIG. 5 is a conceptual diagram of an example of an embedded-removable-boot-drive system including biometric-data authentication.

FIG. 5 is a conceptual diagram 500 of an example of an embedded-RBD system including biometric-data authentication. The diagram 500 includes an embedded-RBD host device 202, a mount opening 204 located on the right side of the embedded-RBD host device 202, an embedded-RBD plug-in device 208 that can be attached to the mount opening 204, a biometric-data sensor 526, and an internal battery 528. In a specific implementation, data on the embedded-RBD plug-in device 208 can be accessed through the embedded-RBD host device 202 only if the biometric data sensor 526 provides affirmative authentication of identity. In a specific implementation, the data on the embedded-RBD plug-in device 208 can be accessed through the embedded-RBD host device 202 only if the biometric data sensor 526 provides affirmative authentication of identity and the correct knowledge-based information is provided to the embedded-RBD plug-in device 208.

The biometric-data sensor 526 is intended to represent a sensor that can determine personal-identification information of a user. In the diagram 500, the biometric-data sensor 526 is a fingerprint scanner. However, in another implementation, the biometric-data sensor 526 is able to distinguish between users based on voice, facial features, iris characteristics, or vein characteristics. In a specific implementation, the biometric-data sensor 526 is configured to recognize the biometric data of more than one user. In a specific implementation, the biometric-data sensor 526 provides authentication for access of the data on the embedded-RBD plug-in device 208, but only for a limited period of time.

The internal battery 528 is intended to represent an internal power supply for the embedded-RBD plug-in device 208 and its associated devices. In a specific implementation, the internal battery 528 is configured to be removable from the embedded-RBD plug-in device 208. In a specific implementation, the internal battery 528 is charged by the embedded-RBD host device 202 when the embedded-RBD plug-in device 208 is attached to the mount-opening 204. In a specific implementation, the internal battery 528 provides power to the biometric-data sensor 526. In a specific implementation, the internal battery 528 provides power to a GPS device (not shown) that is internal to the embedded-RBD plug-in device 208. In a specific implementation, the internal battery 528 includes a solar cell on the embedded-RBD plug-in device 208.

In a specific implementation, the embedded-RBD plug-in device 208 is at least partially external to the mount opening 204 and the embedded-RBD host device 202 when the embedded-RBD plug-in device 208 is connected to the mount opening 204, so that the biometric-data sensor 526 can be used when the embedded-RBD plug-in device 208 is connected to the internal battery 528 in the embedded-RBD host device 202.

Figure 6:
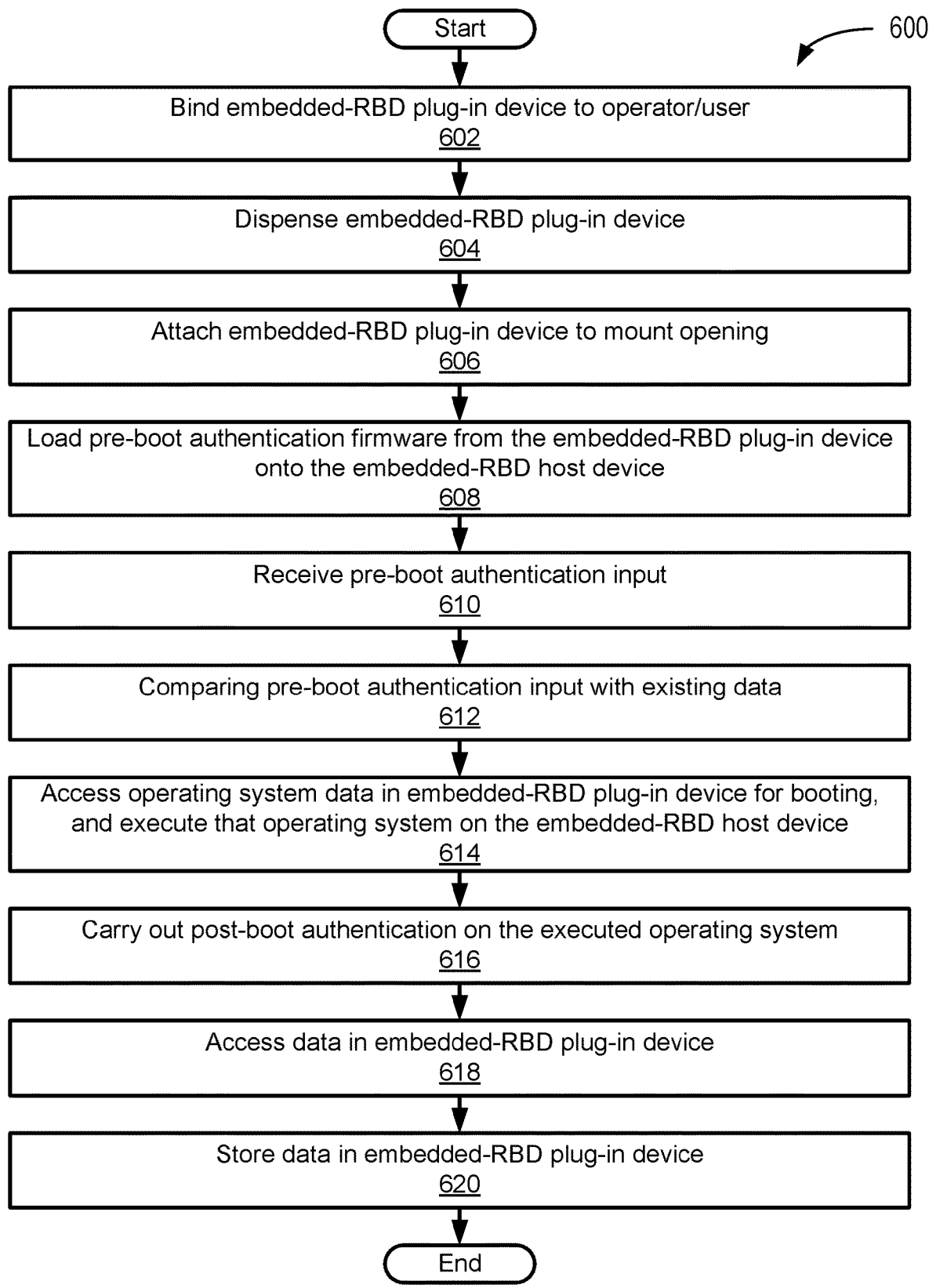
FIG. 6 is a flowchart of an example of a method for providing access to data in an embedded-removable-boot-drive system.

FIG. 6 is a flowchart 600 of an example of a method for providing access to data in an embedded-RBD system. This flowchart and the other flowcharts described in this paper illustrate modules (and potentially decision points) organized in a fashion that is conductive to understanding. It should be recognized, however, that the modules can be reorganized for parallel execution, reordered, or modified (changed, removed, or augmented), where circumstances permit.

The flowchart 600 begins at module 602 with binding an embedded-RBD plug-in device with a user or user. An applicable engine such as an embedded-RBD binding engine as described in this paper binds an embedded-RBD plug-in device to a user or user. Depending on implementation-specific or other considerations, binding an embedded-RBD plug-in device to a user or user includes obtaining identification information of a user and recording an association between at least one embedded-RBD plug-in device and at least one user.

The flowchart 600 continues to module 604 with dispensing an embedded-RBD plug-in device. An applicable engine such as an embedded-RBD plug-in dispensing engine as described in this paper dispenses an embedded-RBD plug-in device. Depending on implementation-specific or other considerations, dispensing an embedded-RBD plug-in device includes processing an embedded-RBD plug-in device and providing the processed embedded-RBD plug-in device to a designated user.

The flowchart 600 continues to module 606 with attaching the embedded-RBD plug-in device to the mount opening. An applicable engine such as an embedded-RBD plug-in device attachment engine described in this paper attaches the embedded-RBD plug-in device to the mount opening. Depending on implementation-specific or other considerations, attaching the embedded-RBD plug-in device to the mount opening may include: inserting the embedded-RBD plug-in device into the mount opening so that it is either entirely or partially encompassed by the mount opening; attaching electrical connections between the embedded-RBD plug-in device and the mount opening at the same time the two are brought together, or through an additional step; and maintaining the attachment between the embedded-RBD plug-in device and the mount opening through the use of a mount clip, a plug-in clip, a lock, or a combination of a mount clip, a plug-in clip, and a lock.

The flowchart 600 continues to module 608 with loading pre-boot authentication firmware from the embedded-RBD plug-in device onto the embedded-RBD host device. An applicable engine such as a pre-boot authentication request engine described in this paper loads a pre-boot authentication request on the embedded-RBD host device from the embedded-RBD plug-in device. In a specific implementation, the pre-boot authentication request includes altering the display of a screen of the embedded-RBD host device. In a specific implementation, the pre-boot authentication request includes sending data to a two-factor-authentication device or requesting data from a two-factor-authentication device. In a specific implementation, the pre-boot authentication request includes preparing previously recorded data to be compared with data to be collected by a biometric-data sensor, provided by a two-factor authentication device, or provided through the embedded-RBD host device. In a specific implementation, loading pre-boot authentication firmware includes decrypting encrypted data.

The flowchart 600 continues to module 610 with receiving pre-boot authentication input. An applicable engine such as a pre-boot authentication input engine described in this paper receives pre-boot authentication input. In a specific implementation, a pre-boot authentication input includes providing knowledge-based information to the embedded-RBD host device. In a specific implementation, a pre-boot authentication input includes receiving information from a biometric-data sensor. In a specific implementation, a pre-boot authentication input includes receiving data that is delivered manually through a keyboard of the embedded-RBD host device. In a specific implementation, a pre-boot authentication input includes receiving data directly from a two-factor authentication device.

The flowchart 600 continues to module 612 with comparing pre-boot authentication input with existing data. An applicable engine such as a pre-boot authentication comparison engine as described in this paper compares pre-boot authentication input with existing data. In a specific implementation, comparing pre-boot authentication input with existing data includes presenting the data from the pre-boot authentication engine in conjunction with data stored on the embedded-RBD plug-in device for pre-boot authentication purposes, and if the input data substantially or exactly matches the existing data, the embedded-RBD system proceeds to module 614. In a specific implementation, the existing data is stored in the embedded-RBD plug-in device by the embedded-RBD binding engine.

The flowchart 600 continues to module 614 with accessing operating-system data in the embedded-RBD plug-in device for booting. An applicable engine such as an OS-accessing engine as described in this paper accesses operating system data in the embedded-RBD plug-in device for booting. In a specific implementation, accessing the operating system data for booting includes: loading an operating system so that the embedded-RBD host device presents an initial logon-screen; and preparing programs on at least one of the embedded-RBD host device and the embedded-RBD plug-in device to begin running. In a specific implementation, accessing operating system data includes decrypting encrypted data. In a specific implementation, accessing operating system data includes executing the decrypted data.

The flowchart 600 continues to module 616 with carrying out post-boot authentication on the executed operating system. An applicable engine such as a post-boot authentication engine as described in this paper carries out post-boot authentication. In a specific implementation, post-boot authentication includes providing a password and username, comparing the password and username to previously-stored data, and determining whether there is a match. In a specific implementation, post-boot authentication includes receiving information from the biometric-data sensor. In a specific implementation, post-boot authentication includes receiving data that is delivered manually through a keyboard of the embedded-RBD host device. In a specific implementation, post-boot authentication includes receiving data directly from a two-factor authentication device. In a specific implementation, the embedded-RBD system provides a notification to a user that post-boot authentication was successful. In a specific implementation, carrying out post-boot authentication includes reading encrypted data, decrypting that data, and matching that decrypted data with the pre-boot authentication input.

The flowchart 600 continues to module 618 with accessing data in the embedded-RBD plug-in device. An applicable engine such as a data-accessing engine as described in this paper provides access to data on the embedded-RBD plug-in device. In a specific implementation, accessing data includes accessing only a portion of the data on the embedded-RBD plug-in device. In a specific implementation, accessing data includes unencrypting all of the data stored on the embedded-RBD plug-in device for use, or for display, or for otherwise managing the data, on the embedded-RBD host device. In a specific implementation, the accessed data is user-specific, leaving a portion of the data on the embedded-RBD plug-in device inaccessible by the user. In a specific implementation, accessing data includes decrypting encrypted data. In a specific implementation, accessing data includes executing or loading decrypted data.

The flowchart 600 continues to module 620 with storing data in the embedded-RBD plug-in device. An applicable engine such as a data-storing engine as described in this paper stores data in the embedded-RBD plug-in device. In a specific implementation, a user can store, delete, or otherwise manage data in the embedded-RBD plug-in device when accessing the data. In a specific implementation, the data stored on the embedded-RBD plug-in device is user-specific. In a specific implementation, stored data is encrypted by the embedded-RBD plug-in device. In a specific implementation, data is stored and re-encrypted on the embedded-RBD plug-in device prior to disconnection of the embedded-RBD plug-in device from the mount opening.

Figure 7:
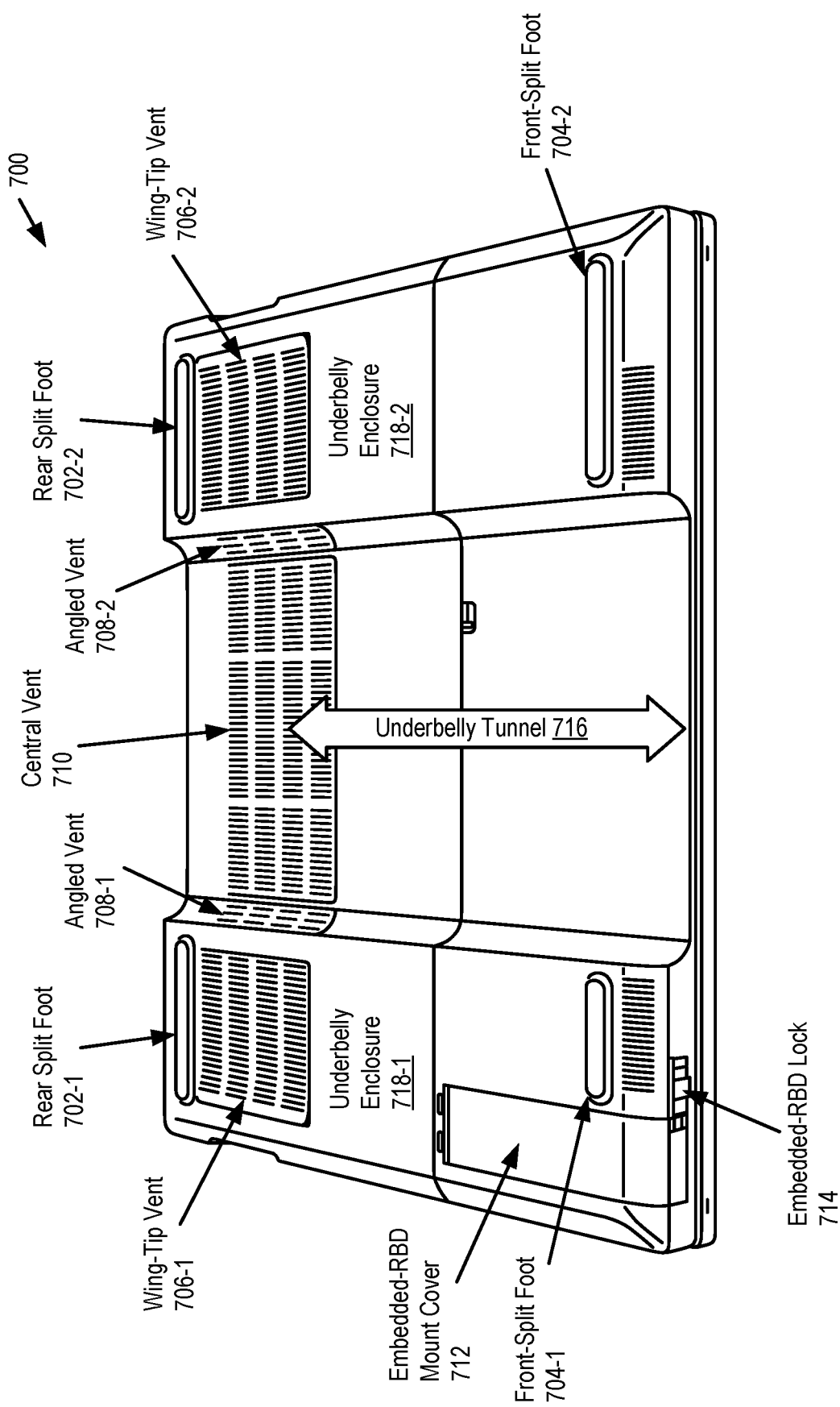
FIGS. 7-9 are underside images of an actual reduction to practice of a laptop with an embedded-RBD.

FIG. 7 is an underside image 700 of an actual reduction to practice of a laptop with an embedded-RBD. The image 700 includes a rear split foot 702-1 and a rear split foot 702-2 (collectively, the rear split feet 702), a front split foot 704-1 and a front split foot 704-2 (collectively, the front split feet 704), a wing-tip vent 706-1 and a wing-tip vent 706-2 (collectively, the wing-tip vents 706), an angled vent 708-1 and an angled vent 708-2 (collectively, the angled vents 708), a central vent 710, an embedded-RBD mount cover 712, an embedded-RBD lock 714, an underbelly tunnel 716, and a right underbelly enclosure 718-1 and a left underbelly enclosure 718-2 (collectively, the underbelly enclosures 718).

The rear split feet 702 and the front split feet 704, in comparison to more conventional unbroken laptop offset strips, are split to accommodate the underbelly tunnel 710. In a specific implementation, the rear split feet 702 and the front split feet 704 are made of rubber or some other applicable material. In various implementations, the feet are configured to grip a planar surface (such as a table top) in four quadrants of the bottom surface of the laptop. No significant degradation of the functionality of the offsets by virtue of splitting them has been observed. In an alternative, left and right feet (not shown) are located in the vertical center of the bottom under the air vents on the underbelly enclosures 718.

The wing-tip vents 706 are air intake vents for the laptop. In a specific implementation, the wing-tip vents 706 provide some additional stability when the laptop is placed on the lap of a human. For example, the wing-tip vents 706 can provide some additional friction when a force induces the laptop to slide horizontally or when one side of the laptop is higher than the other.

The angled vents 708 are air intake vents for the laptop. In a specific implementation, the angled vents 708 provide some horizontal airflow even if other (horizontal) vents are blocked by a surface. For example, when a laptop rests on a soft surface, such as a bed, air intake from a bottom horizontal vent can be significantly blocked, but the angled vents 708 would be less likely to be similarly blocked.

The central vent 710 is an air intake vent for the laptop. In a specific implementation, the central vent 710 is displaced from the lowest surface of the laptop by a distance that depends upon the volume requirements of an embedded-RBD (not shown). Advantageously, the central vent 710 is located on a different vertical plane than the wing-tip vents 706, which increases the probability that when the wing-tip vents 706 are blocked, the central vent 710 will remain unblocked (and vice versa).

Figure 8:
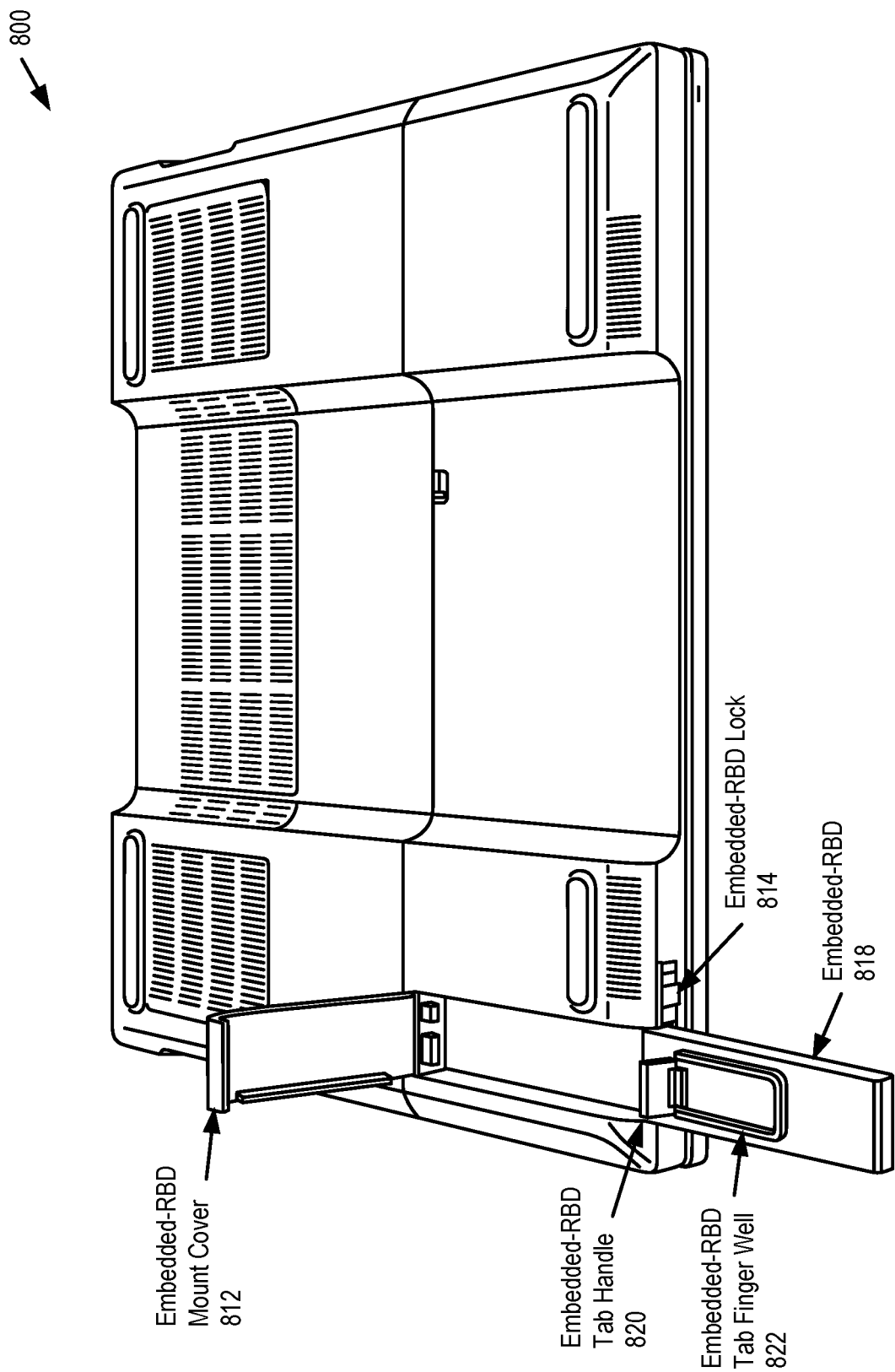

The embedded-RBD mount cover 712 covers an embedded-RBD in a cavity underneath the embedded-RBD mount cover 712 (not shown, but see FIG. 8). In a specific implementation, the embedded-RBD mount cover 712 is substantially flush with the lower surface of the laptop housing. (It may be noted the rear split feet 702, the front split feet 704, and wing-tip vents 706 extend an additional distance from the lower surface of the laptop housing.)

The embedded-RBD lock 714 is a mechanism for ensuring the embedded-RBD is firmly attached to the laptop. Instead or in addition, the embedded-RBD lock 714 can ensure the embedded-RBD mount cover 712 is secured in place. In the example of FIG. 7, the embedded-RBD lock 714 is in a fastened (or "locked") configuration. In this example, when the embedded-RBD lock 714 thumb contact is pushed to the right (left from the perspective of the image 700 because the laptop is upside down) the embedded-RBD lock 714 is an unfastened (or "unlocked") configuration, facilitating removal of the embedded-RBD. It may or may not be possible to unlock the embedded-RBD lock 714 while the embedded-RBD mount cover 712 is closed.

The underbelly tunnel 716 provides a channel for air to reach the angled vents 708 and the central vent 710. In addition, the relief provided from the walls forming the sides of the underbelly tunnel 716 can aid in stopping the laptop from sliding off of the human's lap if the added stability from the wing-tip vents 706 is insufficient to prevent slippage. The underbelly tunnel 716 is located between the underbelly enclosures 718.

The underbelly enclosures 718 are designed to include adequate storage space for an embedded-RBD (not shown, but see FIG. 8) and interposer board, allowing the embedded-RBD to connect to the motherboard with minimal bulk added to the system. The width of the underbelly enclosures 718 is also sufficient to house the parts associated with the embedded-RBD. It may be noted that the underbelly enclosure 718-1 houses the embedded-RBD, but the underbelly enclosure 718-2 does not. That means it would be possible to eliminate the underbelly enclosure 718-2. However, it was determined that matching underbelly enclosures was more comfortable for use of the laptop on a human lap, and also aesthetically more pleasing. It may be further noted the underbelly enclosures need not necessarily extend the full depth of the laptop and that the underbelly enclosure widths could be increased or decreased depending upon a need to house hardware, for comfort, or for aesthetic purposes, with the minimum size dictated by the need to house hardware.

FIG. 8 is an underside image 800 of an actual reduction to practice of a laptop with an embedded-RBD. The image 800 includes an embedded-RBD mount cover 812, an embedded-RBD lock 814, and an embedded-RBD 818.

The embedded-RBD mount cover 812 is in an open position in the image 800. In the open position, a securing latch is not engaged with the laptop housing and an embedded-RBD cavity is accessible.

The embedded-RBD lock 814 is in an unfastened configuration in the image 800. In the unfastened configuration, the embedded-RBD 818 can be inserted into the embedded-RBD cavity exposed when the embedded-RBD mount cover 812 is in an open position. In a specific implementation, the area under a thumb contact of the embedded-RBD lock 814 is color-coded to indicate the unfastened configuration. For example, a red rectangular area may be visible when the thumb contact of the embedded-RBD lock 814 is pushed to the left (to the right in the image 800 because the laptop is upside down).

The embedded-RBD 818 is barely engaged to the housing of the laptop in the image 800, signifying it is just about to be installed in (or removed from) the embedded-RBD cavity. The embedded-RBD 818 includes an embedded-RBD tab handle 820 and an embedded-RBD tab finger well 822. In the image 800, the embedded-RBD tab handle 820 is in a vertical configuration, which facilitates using the structure as a handle when moving the embedded-RBD 818 into or out of the embedded-RBD cavity. The embedded-RBD tab finger well 822 comprises a low wall surrounding the embedded-RBD tab handle 820, which facilitates using a finger to lift the embedded-RBD tab handle 820 from a horizontal configuration to the vertical configuration illustrated in the example of FIG. 8.

Figure 9:
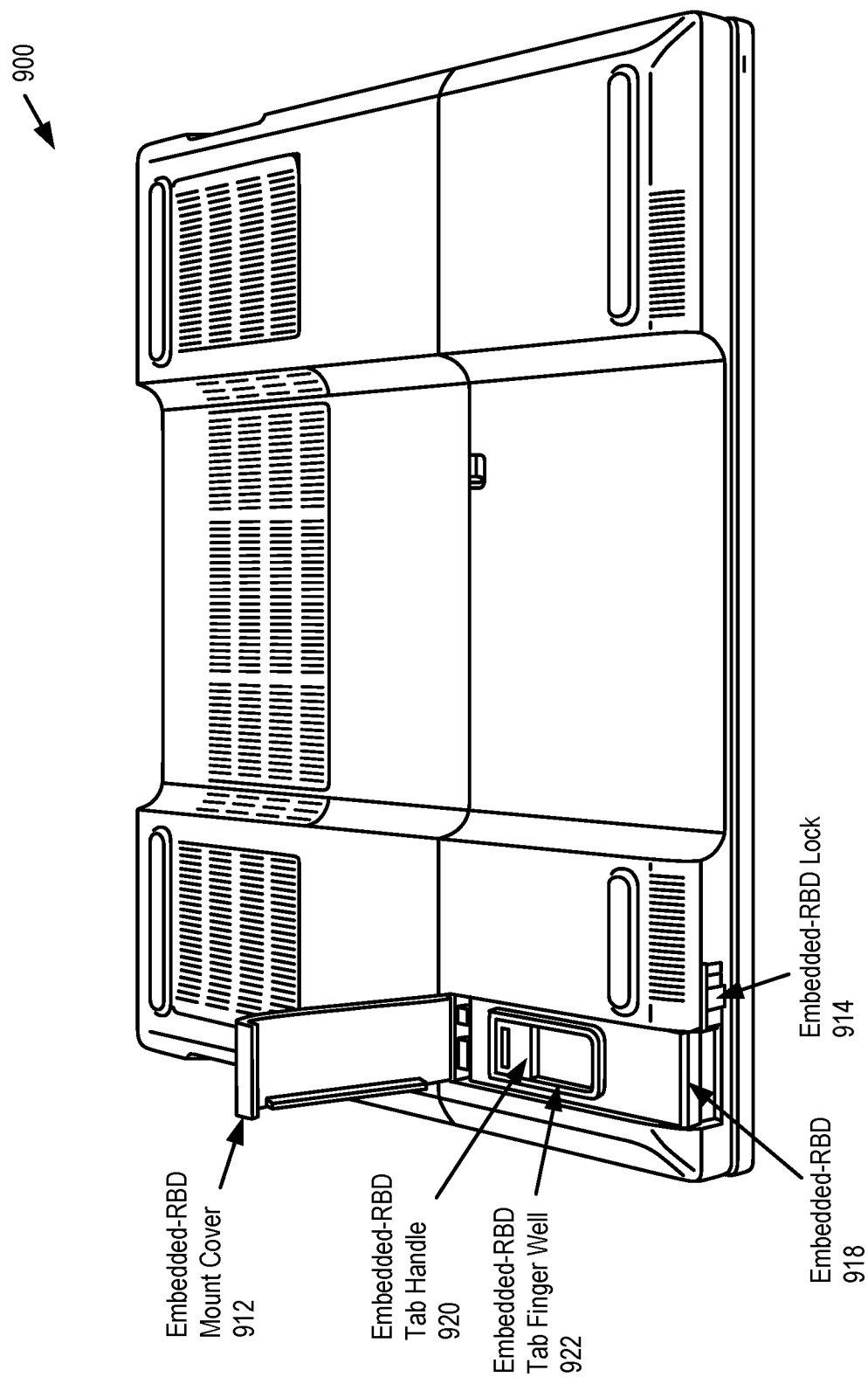

FIG. 9 is an underside image 900 of an actual reduction to practice of a laptop with an embedded-RBD. The image 900 includes an embedded-RBD mount cover 912, an embedded-RBD lock 914, and an embedded-RBD 918. The embedded-RBD mount cover 912 is in an open position as in image 800, but the embedded-RBD lock 914 is in a fastened configuration, which indicates the embedded-RBD 918 is securely installed in the embedded-RBD cavity.

Figure 10:
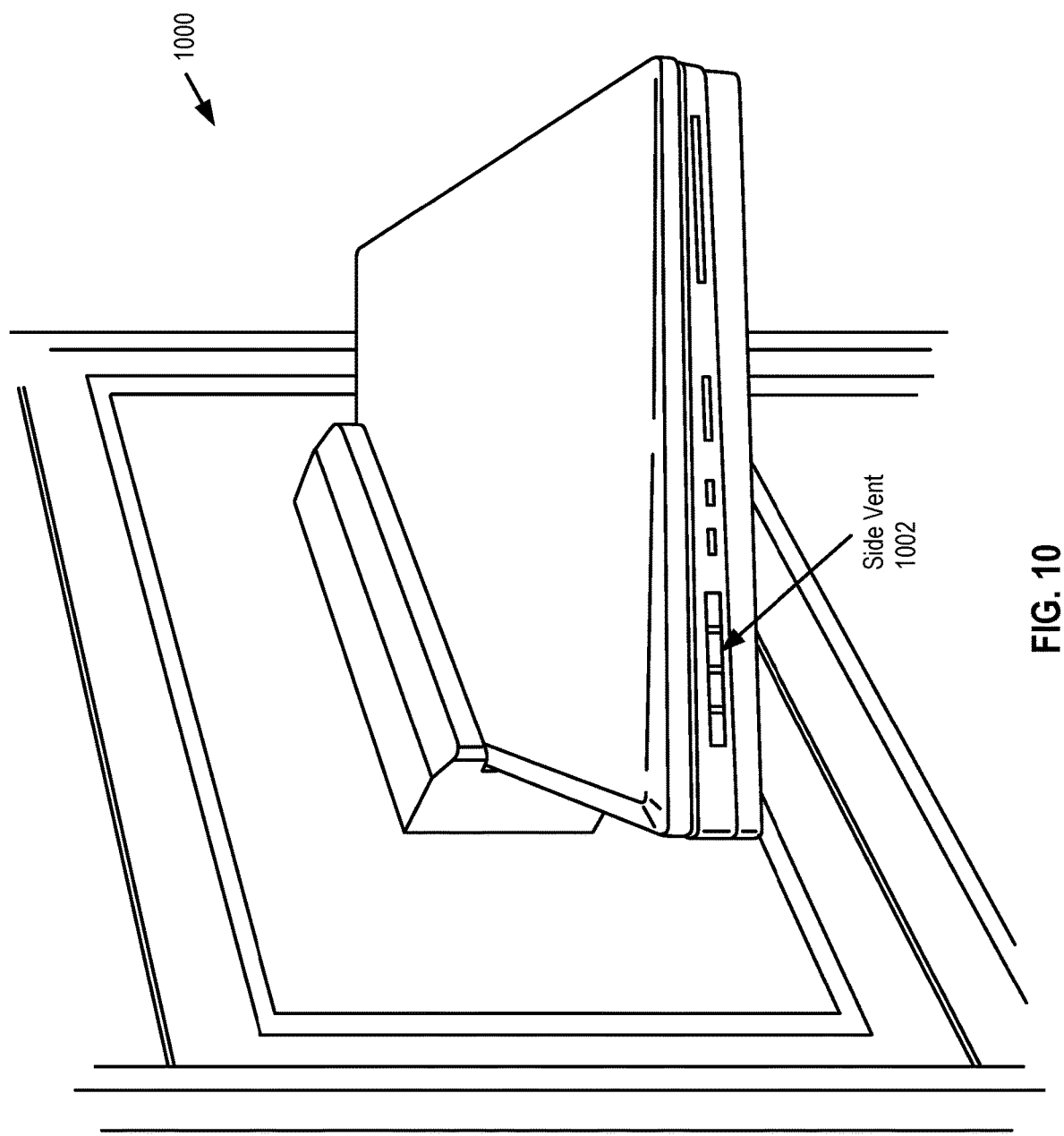
FIG. 10 is a side image of an actual reduction to practice of a laptop with an embedded-RBD in a testing environment.

FIG. 10 is a side image 1000 of an actual reduction to practice of a laptop with an embedded-RBD in a testing environment. The image 1000 is intended to illustrate a side vent 1002 (on the right-hand side), which tapers toward the front of the laptop. The laptop itself also tapers toward the front, becoming less thick in the front compared to the rear of the laptop. The results of the testing include an observation that circulation of air with this design is superior to that of a known laptop configuration.

In the actual reduction to practice, the left-hand side vent (not shown) was measured to have an air flow of 4.45 cubic feet per minute (CFM). The side vent 1002 was measured to have a dynamic air flow of 5.08 CFM (with a range of 4.0 to 5.1 CFM). In a scenario in which air flow is impeded, the multiplanar intake vents may enable air flow to remain at desired operational parameters. In an alternative, the length and/or width of the vents are increased to increase air flow. In yet another alternative, the shape of the air vents are changed to increase or decrease air flow.

The entire system for securing and/or using an embedded-RBD plug-in device and an embedded-RBD host device, as well as the use of a two-factor-authentication device, can be managed using the techniques described in this paper. These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

The invention claimed is:

1. A removable boot drive (RBD) system comprising:
an embedded-RBD host device;
a mount opening, located on the embedded-RBD host device, comprising:
   an electrical connection;
   a clip or lock;
an embedded-RBD plug-in device, which can be attached to the mount opening, the embedded-RBD plug-in device comprising:
   an RBD housing, the RBD housing comprising a planar top surface and a planar bottom surface;
   a tab handle coupled to the planar top surface of the RBD housing;
   a tab finger well, wherein a bottom portion of the tab finger well comprises a portion of the planar top surface of the RBD housing, and wherein the tab finger well comprises a wall surrounding the tab handle which facilitates using a finger to lift the tab handle from a horizontal configuration to a vertical configuration;
a boot drive;
memory-storage.

2. The system of claim 1, wherein the mount opening is located on a side of the embedded-RBD host device.

3. The system of claim 1, comprising a two-factor-authentication device.

4. The system of claim 1, comprising a biometric-data sensor configured to provide an authorization input.

5. The system of claim 1, comprising a smartwatch for use as a two-factor authentication device.

6. The system of claim 1, wherein the mount opening further comprises a lid.

7. The system of claim 1, wherein the tab handle is configured for extracting the embedded-RBD plug-in device from the mount opening, and the embedded-RBD plug-in device can be removed without removing a battery.

8. The system of claim 1, wherein the embedded-RBD plug-in device further comprises a solid state drive (SSD) embedded within a caddy.

9. The system of claim 1, wherein, when the embedded-RBD plug-in device is attached to the mount opening and a user is successful with providing certain authentication inputs, the data on the embedded-RBD plug-in device can be accessed through the embedded-RBD host device.

* * * * *